United States Patent
Strand

(10) Patent No.: US 10,042,995 B1
(45) Date of Patent: Aug. 7, 2018

(54) DETECTING AUTHORITY FOR VOICE-DRIVEN DEVICES

(71) Applicant: AMAZON TECHNOLOGIES, INC., Seattle, WA (US)

(72) Inventor: William Alexander Strand, Sammamish, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/016,165

(22) Filed: Feb. 4, 2016

Related U.S. Application Data

(63) Continuation of application No. 14/090,939, filed on Nov. 26, 2013, now Pat. No. 9,257,133.

(51) Int. Cl.
| | |
|---|---|
| *G10L 21/00* | (2013.01) |
| *G06F 21/32* | (2013.01) |
| *G06N 99/00* | (2010.01) |
| *G10L 15/22* | (2006.01) |
| *G10L 15/25* | (2013.01) |
| *G10L 17/00* | (2013.01) |
| *G10L 17/26* | (2013.01) |

(52) U.S. Cl.
CPC ............ *G06F 21/32* (2013.01); *G06N 99/005* (2013.01); *G10L 15/22* (2013.01); *G10L 15/25* (2013.01); *G10L 17/005* (2013.01); *G10L 17/26* (2013.01); *G10L 2015/223* (2013.01); *G10L 2015/227* (2013.01)

(58) Field of Classification Search
CPC ....... G10L 17/005; G10L 17/22; G10L 15/22; G10L 15/265; G06F 21/32

USPC ....... 704/220, 243, 249, 254, 270–271, 273, 704/275, 246; 713/166
See application file for complete search history.

(56) References Cited

U.S. PATENT DOCUMENTS

| | | | |
|---|---|---|---|
| 8,503,686 B2* | 8/2013 | Jing | G10L 21/0208 381/71.1 |
| 9,257,133 B1* | 2/2016 | Strand | G06F 21/32 |
| 2002/0143242 A1* | 10/2002 | Nemirovski | H04B 1/3877 600/300 |
| 2002/0194003 A1 | 12/2002 | Mozer | |
| 2003/0163306 A1 | 8/2003 | Manabe et al. | |
| 2004/0176958 A1 | 9/2004 | Salmenkaita et al. | |
| 2004/0243416 A1* | 12/2004 | Gardos | G10L 15/25 704/275 |
| 2005/0141735 A1* | 6/2005 | Kim | H04S 1/002 381/313 |

(Continued)

OTHER PUBLICATIONS

Chawan, Vijay B., "Notice of Allowance dated Oct. 2, 2015", U.S. Appl. No. 14/090,939. The United States Patent and Trademark Office, filed Oct. 2, 2015.

(Continued)

*Primary Examiner* — Vijay B Chawan
(74) *Attorney, Agent, or Firm* — Lindauer Law, PLLC

(57) ABSTRACT

A computing device senses speech or other user input. One or more physical variables pertaining to a user of the computing device are also sensed, and respective signals are analyzed or compared to the user input. The analysis determines if the user input is likely that of an authorized user, and assigns a confidence metric to that determination. The computing device may then perform actions corresponding to the speech or user input content in accordance with the determination.

20 Claims, 7 Drawing Sheets

(56) References Cited

U.S. PATENT DOCUMENTS

| | | | |
|---|---|---|---|
| 2007/0241861 A1* | 10/2007 | Venkatanna | G06F 21/32 340/5.52 |
| 2007/0291953 A1 | 12/2007 | Ngia et al. | |
| 2007/0299670 A1* | 12/2007 | Chang | G07C 9/00087 704/275 |
| 2011/0221671 A1* | 9/2011 | King, III | G02B 27/017 345/156 |
| 2011/0222745 A1* | 9/2011 | Osterhout | G02B 27/017 382/118 |
| 2012/0062445 A1* | 3/2012 | Haddick | G02B 27/017 345/8 |
| 2012/0206236 A1 | 8/2012 | King | |
| 2012/0249797 A1* | 10/2012 | Haddick | G06F 1/163 348/158 |
| 2012/0299826 A1* | 11/2012 | Moeller | G10L 25/75 345/158 |

OTHER PUBLICATIONS

Nahvi, Reza, "Non-Final Office Action dated Apr. 20, 2015", U.S. Appl. No. 14/090,939. The United States Patent and Trademark Office, filed Apr. 20, 2015.

\* cited by examiner

DETECTING AUTHORITY FOR VOICE-DRIVEN DEVICES

PRIORITY

This application is a continuation of, and claims priority to, pending U.S. patent application Ser. No. 14/090,939, filed Nov. 26, 2013, entitled "Secure Input To A Computing Device." The entirety of this previously filed application is hereby incorporated by reference.

BACKGROUND

Various computing devices accept and respond to verbal user commands and inputs. Users seek to operate their computing devices in public or social environments free from erroneous or unauthorized operations resulting from the speech of others. For example, a user with a wearable computing device may not want the speech from someone standing next to them to operate their device. Methods and apparatus for improving the secure and reliable operation of such computing devices are continually sought after.

Figure 1:
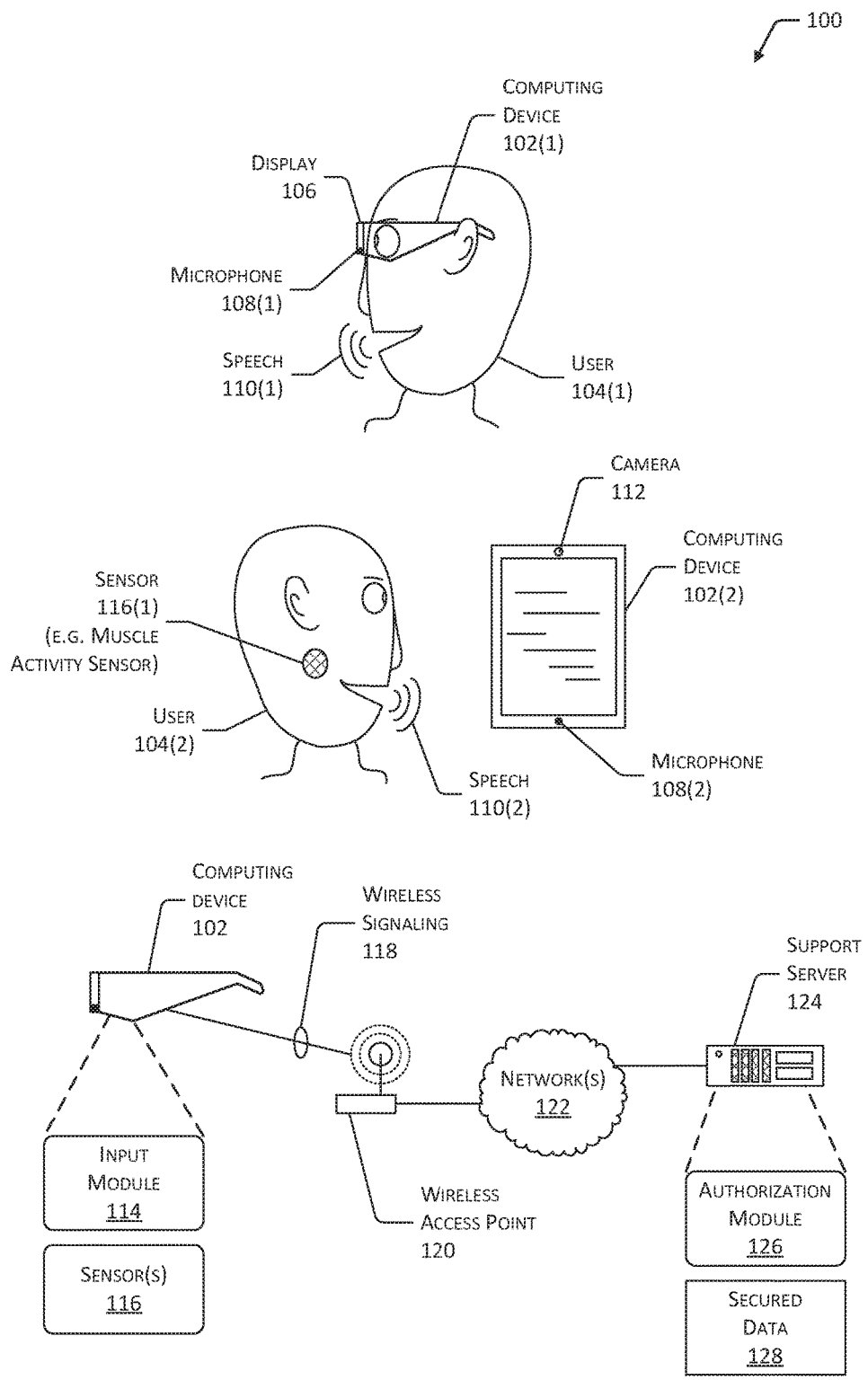
FIG. 1 depicts a system configured to support analysis of physical variables to authenticate user input.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Some computing devices accept verbal commands or inputs and respond accordingly. Wearable computers, cellular telephones, tablet computers, laptop computers, media access or viewing devices, and the like, are just a few examples. Such computing devices may perform respective functions, access various services provided by remote or network-based apparatus, and so forth.

Concern regarding unauthorized or unintended operation of such a computing device arises within public or social environments, such as open office spaces, shopping areas, hotel lobbies, or other locations where different persons may be talking near the computing device. Specifically, a person speaking within detectable proximity of a computing device may be erroneously interpreted as issuing a command or input. Thus, a computing device might respond by accepting input or executing commands given by someone other than an authorized user. Furthermore, a malicious party may use electronic recording means to record a verbal command issued by an authorized user, only to playback that command to a computing device at another time with detrimental effect.

Sensors may be used to detect a wide range of physical variables associated with an authorized user. Pulse rate, respiration rate, movement of the user's mouth, air pressure changes within an ear canal, muscle or nerve impulses, and numerous other biomedical variables may be sensed or measured. Such involuntary or incidental phenomenon may exhibit characteristics that correspond to the utterance of speech. That is, such a physical variable or variables may be sensed, and corresponding electronic signaling may be analyzed or compared with that of speech detected using a microphone or other sensor. Temporal fluctuations, heuristic matches, or other respective factors may indicate whether or not detected speech originated from the authorized user.

Sensors or other input devices may also be used to generate a signal that may be used to verify a source of detected speech. For example, an authorized user may assume an inclined or tilted orientation of their head while issuing verbal input to a wearable computer. The tilted orientation may be detected by way of an accelerometer, gyroscope, tilt sensor, and so forth. In another example, an authorized user may maintain fingertip contact with a fingerprint biometric sensor while uttering verbal commands to a computing device. These and other user actions may be used to verify that detected speech is that of an authorized user.

Machine-learning techniques may be used to associate the physical variables with speech of the authorized user. For example, a biomedical sensor may be used to sense muscle impulses related to jaw motion. An initial learning operation may be performed, wherein analysis of the related sensor signals provides an impulse pattern "signature" or set of signatures for a given authorized user. This learned information may be stored and used thereafter during real-time operations when the same user is issuing verbal commands or inputs.

The same machine-learning information may also be augmented or adjusted over time in accordance with changes in the user's speaking habits or characteristics. In another example, analysis of an authorized user's pulse rate may reveal patterns or characteristics that are stored and used during future authorization of speech. Other numerous machine-learning or signal processing techniques may also be used.

The foregoing and other techniques may also be used in situations where user input to the computing device is non-verbal. For instance, nerve impulses detected by a corresponding biomedical sensor of a wristband may be compared with learned information for an authorized user. User input to a keyboard or button pad may thus be authenticated before the corresponding computing device responds or acts thereupon. Respective variations on the foregoing may also be used in accordance with the methods, devices and systems described herein.

FIG. 1 depicts views 100 including particular computing devices, other elements, and operations performed by each. The views 100 are illustrative and non-limiting in nature, and other elements, devices, systems or respective operations are also contemplated.

A computing device 102(1) is associated with a user 104(1). As depicted, the computing device 102(1) is a wearable computer having a display 106 positioned in front of an eye or eyes of the user 104(1). The display 106 is configured to present text, images, indicia or other visible matter to the user 104(1). In one implementation, the display 106 is a transparent "heads up" display wherein the user 104(1) may also view real-world objects disposed in the distance beyond the display 106.

The computing device 102(1) also includes a microphone 108(1) configured to detect speech 110(1) of the user 104(1) and to provide corresponding signals. The computing device 102(1) may further include an accelerometer, tilt switch, or other sensors that provide signaling indicative of a tilt or orientation of the computing device 102(1), in accordance with the tilt or orientation of the head of the user 104(1).

The computing device 102(1) includes a hardware processor or processors configured to perform various operations according to a machine-executable program code. The computing device 102(1) is further configured to function in response to commands or inputs provided by way of the speech 110(1). Thus, the computing device 102(1) may perform various functions or invoke respective services based upon verbal content of the speech 110(1).

The computing device 102(1) may be configured to determine the orientation of the head of the user 104(1) during times that verbal input is detected by the microphone 108(1). For instance, the computing device 102(1) may be configured to recognize verbal input as the speech 110(1) of the user 104(1) if the orientation of the computing device 102(1) is consistent with a predetermined value or range. Thus, the user 104(1) may tilt their head to a particular stance or position in order for the computing device 102(1) to respond to verbal commands or inputs within the speech 110(1). Verbal inputs detected under other computing device 102(1) orientations may thus be ignored as not being directed to the computing device 102(1), or as originating from someone other than the user 104(1).

A computing device 102(2) is also depicted and is associated with a user 104(2). The illustrative computing device 102(2) is in the form of a tablet computer. The computing device 102(2) includes a microphone 108(2) configured to detect or sense speech 110(2) and to provide corresponding electronic signaling. The computing device 102(2) includes a hardware processor or processors configured to perform various operations according to a machine-executable program code. Additionally, the computing device 102(2) may perform various functions or invoke respective services based upon verbal content within the speech 110(2).

The computing device 102(2) further includes a camera 112. The camera 112 is configured to provide images encoded by way of electronic signals. For instance, the camera 112 may provide images of motions or configurations of a mouth of the user 104(2) while verbal commands or inputs are being given by way of the speech 110(2). Thus, the camera 112 may be used to provide images that are analyzed or compared with respective characteristics of detected verbal input to determine whether or not it is speech 110(2) originating from the user 104(2).

Any particular computing device 102 may include an input module 114. The input module 114 may include a hardware processor, an application-specific integrated circuit (ASIC), executable program code stored on non-transitory computer-readable storage media (CRSM), electronic circuitry, or other constituency. The input module 114 may be configured to receive electronic signals from a microphone 108 and to analyze or determine if verbal commands or inputs are present therein.

For instance, the input module 114 may compare microphone 108 signals and biomedical signals from one or more sensors 116 toward detecting time-varying characteristics that correspond to each other. Peaks and lulls, for example, in muscle impulses may be correlated to peaks and lulls in a stream of verbal input. Other signal processing or heuristics may also be used, toward authenticating the verbal input as user 104 speech 110. If such an authentication is made, the computing device 102 may then identify verbal commands, inputs, values, or other information communicated within the speech 110, confirm the user is authorized to initiate those commands, and respond accordingly.

Authentication generally refers to determining that a specific, known user 104 is the source of speech 110 that is being detected. Thus, "authenticated speech" is speech 110 that is determined to have originated from, or is associated with, a particular user 104. Authorization generally refers to permissions or rights associated with the particular user 104. This may include identifying particular commands, instructions, sets of functions, or other aspects that the particular user 104 is permitted to access or perform using a given computing device 102.

Figure 2:
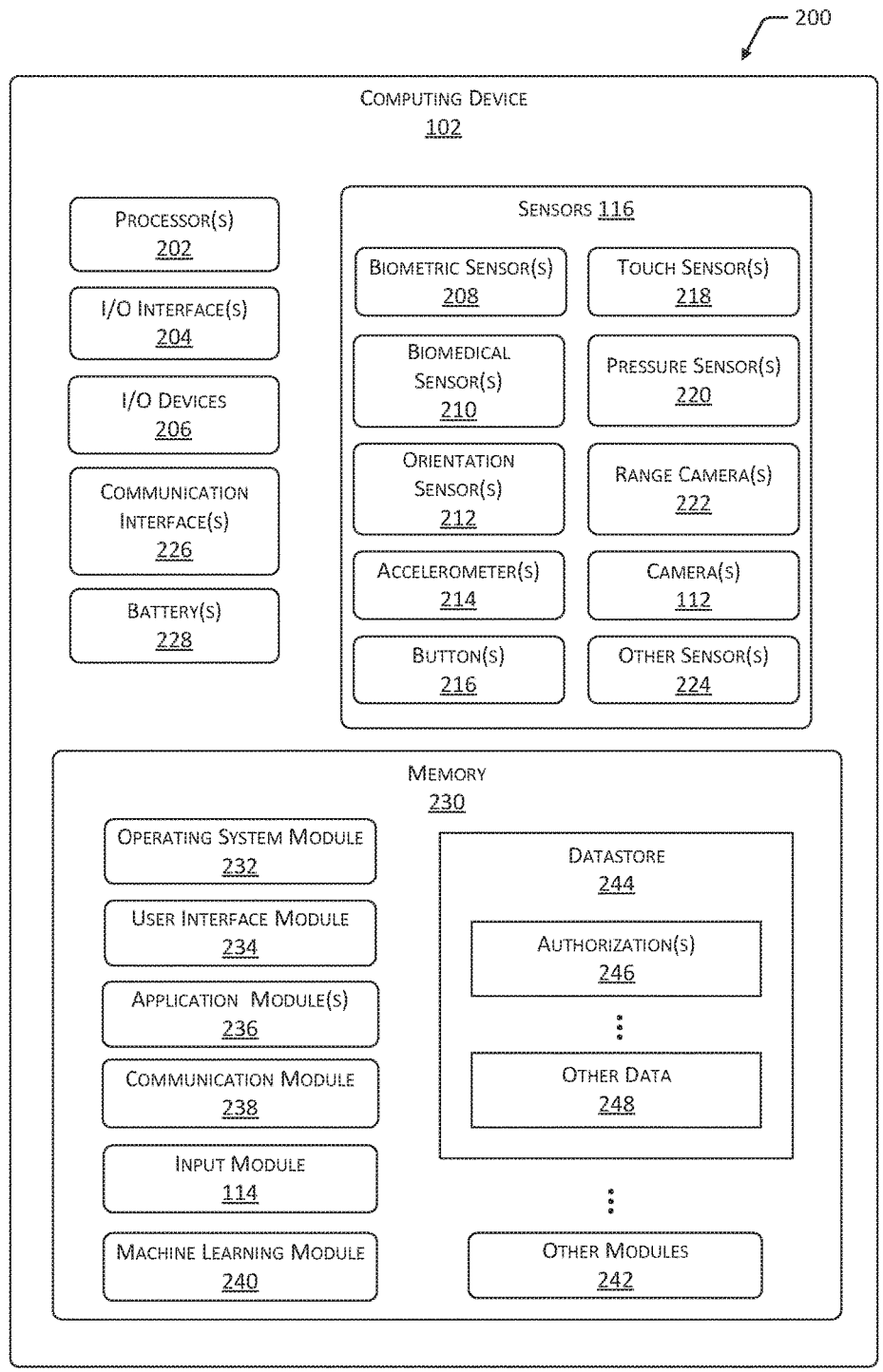
FIG. 2 is a block diagram depicting elements of a computing device configured to authenticate user input.

Also depicted is a muscle activity sensor 116(1) that is supported over jaw musculature of the user 104(2) by way of an adhesive backing or other material. In another instance, the muscle activity sensor 116(1) may be provided as a part of an eyewear-type device, as a part of a hat, or as part of another apparatus. The muscle activity sensor 116(1) is configured to sense muscle activity and to provide corresponding signals by wireless communication to the computing device 102(2), and in turn provided to the machine learning module 240 (FIG. 2). In another example, the sensor 116(1) provides a signal that is communicated to one or more of the networks 122 for communication to one or more computing devices 102. Thus, the sensor 116(1) may be considered as a networked sensor 116.

The muscle activity sensor 116(1) may be variously defined. Non-limiting examples of the muscle activity sensor 116(1) include electrical potential sensors (electromyograph), force sensors, ultrasonic sensors such as used for tissue Doppler imaging, and so forth. Other sensor 116(1) types may also be used, respectively internal or external to the body of the authorized user 104. For example, implanted electromyography sensors may detect the electrical signals from the user's 104 muscles and generate corresponding data.

In another example, two or more respective authorized users 104 are associated with corresponding sensors 116 and one or more microphones 108. The corresponding sensor signals 308 and microphone signal(s) 310 may then be received by a machine learning module 240 such that speech 110 inputs from the plurality of users 104 may be authenticated and acted upon. Thus, two or more sensors 116, microphones 108, or other apparatus may operate respectively and cooperatively in accordance with various techniques contemplated herein, such that respective systems may be defined and used.

The computing device 102 may also communicate information, data or requests using wireless signals 118 to and from a wireless access point 120. In turn, the wireless access point 120 may be connected to communicate with one or more networks 122. Such network(s) 122 may include the Internet or access thereto, local-area networks (LANs), wide-area networks (WANs), and so forth. A support server 124 may be connected to the network(s) 122, such that the computing device 102 may exchange information therewith, request one or more services, and so forth.

The support server 124 may include an authorization module 126 configured to authenticate a user 104 or computing device 102 requesting a service or services. For instance, the computing device 102 may provide an authorization code or certificate to the support server 124 for verification by the authorization module 126. The support server 124 may then provide or deny requested services, accordingly. Other user 104 authorization methods may also be used.

The support server 124 may also include secured data 128. The secured data 128 may include information, values, data structures having respective elements, listings, images, sound files, video matter, or other content to be selectively provided to the computing device 102 upon authorized request. The support server 124 may also perform various other functions or operations in accordance with computing device 102 requests, such as calculations, image or signal processing, data encryption or decryption, and so forth.

FIG. 2 illustrates a block diagram 200 of a computing device 102. The computing device 102 is illustrative and non-limiting, and may be defined by a tablet computer, a wearable computer, an e-book reader, a media device, a cellular phone, or another suitable apparatus. The computing device 102 may include one or more hardware processors 202 configured to execute one or more stored instructions. The processor(s) 202 may comprise one or more cores.

The computing device 102 may include one or more I/O interface(s) 204 to allow the processor(s) 202 or other portions of the computing device 102 to communicate with various other computing devices 102, user devices, the support server 124, web-based resources, and so on. The I/O interfaces 204 may comprise I2C, SPI, USB, RS-232, and so forth.

The I/O interface(s) 204 may couple to one or more I/O devices 206. The I/O devices 206 may include one or more input devices such as a keyboard, mouse, and so forth. The I/O devices 206 may also include one or more output devices such as a display, audio output, haptic output, or other devices. The computing device 102 may also include one or more different types of sensors 116. The sensors 116 may also include one or more biometric sensors 208, such as a fingerprint scanner, retinal scanner, facial recognition scanner, or other suitable devices. The sensors 116 may also include one or more biomedical sensors 210, such as a cardiac pulse sensor, respiration sensor, nerve impulse sensors, muscle impulse or activity sensors, or other suitable sensor type. The respective biomedical sensors 210 may be configured to sense corresponding physical variables independent of, or without sensing, a vibration of the user 104.

The sensors 116 may further include one or more orientation sensors 212. The orientation sensor(s) 212 may be configured to provide respective signals indicative of an orientation, tilt, or positioning of the computing device 102 or some aspect of a corresponding user 104. For instance, a user 104 may place the computing device 102 in some predetermined orientation when the user 104 is issuing verbal commands or inputs by way of speech 110.

The sensors 116 may also include one or more accelerometers 214, configured to provide respective signals indicative of acceleration, velocity, motion, or orientation of the computing device 102. The sensors 116 may further include one or more buttons 216, configured to provide respective signals indicating a user 104 input force applied thereto. For instance, a user 104 may press and hold a button 216 while issuing speech 110 intended as input to the computing device 102, and release the button 216 at other times.

The sensors 116 may also include one or more respective touch sensors 218. The touch sensors 218 may be configured to provide respective signals indicative of contact with a user 104 digit, temple area, or other feature. In one implementation, a touch sensor 218 provides a signal corresponding to the user's galvanic skin response, which may vary between a first level when the user 104 is speaking and a second level when they are not. In another implementation, two touch sensors 218 are used as electrodes to pass a low-level electrical signal through the skin of the user 104, wherein variations in current value may be correlated to issuance of speech 110.

The sensors 116 may further include one or more pressure sensors 220, configured to provide respective signals in accordance with sensed air pressure, or that of another medium of interest. For example, a pressure sensor 220 may provide signals indicative of air pressure in a user 104 ear canal, wherein such pressure exhibits changes corresponding to speech 110. The I/O devices 206 may also include one or more range cameras 222 configured to provide information indicative of a finger, hand, arm, or other gestural inputs by the user 104 to the computing device 102.

The sensors 116 may include the camera 112 introduced above, which may provide images of a user 104 mouth during speech 110. Other sensors 224 may also be included, such as an eye movement scanner, exhalation or inhalation sensor, or another suitable sensor type. One or more of the respective sensors 116 may be configured to communicate signals, indicative of their respective measurements or detections, to other apparatus by way of one or more of the networks 122. Thus, data or information regarding respective sensed physical variables may be provided to numerous computing devices 102, to one or more support servers 124, or to other apparatus.

The computing device 102 may also include one or more communication interfaces 226. The communication interface(s) 226 are configured to provide communications with other computing devices 102, web-based resources, support servers 124, routers, wireless access points 120, and so forth. The communication interfaces 226 may include wireless functions, devices configured to couple to one or more networks including PANs, LANs, WLANs, WANs, and so forth.

The computing device 102 may also include one or more batteries 228 for providing electrical power during normal operations. The battery or batteries 228 may be rechargeable or disposable in nature. Other portable energy sources such as photovoltaic cells, and so forth, may also be used. The computing device 102 may also include one or more busses or other internal communications hardware or software that allow for the transfer of data between the various modules and components of the computing device 102.

The computing device 102 includes one or more memories 230. The memory 230 comprises one or more computer-readable storage media (CRSM). The memory 230 provides storage of computer readable instructions, data structures, program modules and other data for the operation of the computing device 102. The memory 230 may include at least one operating system (OS) module 232. Respective OS modules 232 are configured to manage hardware devices such as the I/O interfaces 204, the I/O devices 206, the communication interfaces 226, and provide various services to applications or modules executing on the processors 202.

Also stored in the memory 230 may be one or more of the following modules. These modules may be executed as foreground applications, background tasks, and so forth. A user interface module 234 may be configured to provide one or more application programming interfaces. The user interface module 234 may be configured to operate with information encoded as hypertext markup language ("HTML")

files, extensible markup language ("XML") files, or in another suitable format or language. The user interface module 234 is configured to accept inputs and send outputs using the I/O interfaces 204, the communication interfaces 226, or both.

The memory 230 may also store one or more of the application modules 236. Non-limiting examples of the application modules 236 include a word processing application, a spreadsheet application, a technical drawing or illustrating application, a web browsing application, a portable document viewing application, and so on. The memory 230 may further store a communication module 238 such that wireless signaling 118 may be communicated to and from the computing device 102.

The memory 230 may also store the input module 114 configured to receive electronic signals from one or more of the I/O devices 206 and to analyze, compare, or process these signals so as to perform various operations. In one instance, the input module 114 may operate to determine if detected speech 110 originates from an authorized user 104. In another instance, the input module 114 may function to identify a user 104 by way of a fingerprint applied to a biometric sensor 208. Other operations may also be performed.

The memory 230 may also include a machine learning module 240. The machine learning module 240 may be configured to perform one or more respective functions. In one example, the machine learning module 240 identifies one or more correspondences between signals from respective sensors of the I/O devices 206 and stores related data or information for later use by the input module 114. For instance, a pattern or patterns detected within user 104 respiration signals provided by a biomedical sensor 210 may be correlated to patterns within speech 110 of that user 104. These characteristic patterns may be used for later verification that an authorized user 104 is the source of detected speech 110, such that the computing device 102 will respond accordingly to any verbal commands, inputs, and so forth within the speech 110.

The machine learning module 240 may include techniques such as clustering, or the training of a classifier. The machine learning module 240 may further use algorithms that include, but are not limited to, one or more of the following: artificial neural networks, inductive logic programming, support vector machines (SVMs), clustering, classification, Bayesian networks, decision tree learning, association rule learning, reinforcement learning, representation learning, similarity learning, metric learning, sparse dictionary learning, and so forth.

Broadly speaking, the machine learning module 240 may use or include any suitable techniques or resources that result in advancing or "evolving" analytical abilities regarding user 104 speech 110, the processing of such speech 110, user 104 identification, and so forth. The machine learning module 240 may, for instance, assume a "basic training mode" when a new, authorized user 104 is introduced to the corresponding computing device 102. After some time learning about a new user 104, the machine learning module 240 may transition to a more active evaluation mode, wherein the machine learning module 240 exercises greater autonomy as to accepting or rejecting particular speech 110 events. Other machine learning module 240 operating modes or patterns may also be used.

In another example, the machine learning module 240 may compare speech 110 signals from a microphone 108 with signals from a pressure sensor 220 within an ear canal of a user 104. The machine learning module 240 may detect temporal correspondences between the two signals with respect to amplitude peaks, inflections, and so forth and calculate a corresponding confidence value indicative of the likelihood that the speech 110 originates from the user 104. Other operations of the machine learning module 240 may also be performed.

Different commands or functions may be available or restricted in accordance with the confidence values determined for respective speech 110 utterances or events. For example, if a relatively low confidence value is calculated for a specific speech 110 event, then only operations of relatively low security concern may be allowed. For instance, a user 104 may say "increase font size to 14 points" while verbally reciting text for inclusion in an e-mail. Such a command may be a low security concern, and so a relatively low confidence value is required for execution by the computing device 102. In another example, speech 110 may include "print the contents of this message". If the message is of a confidential or secured nature, then a relatively higher confidence value is also required in order to generate the requested hardcopy. Other examples and scenarios may also be considered.

The machine learning module 240 may include a processor, microcontroller, ASIC, executable code stored on CRSM, or other elements or constituents. The memory 230 may also include one or more other modules 242. Non-limiting examples of the other modules 242 may include cellular communications circuitry, a watchdog or other timer, a radio receiver, ports or resources for wired communications, and so forth.

The memory 230 may also include a datastore 244 to store information. The datastore 244 may use a flat file, database, linked list, tree, executable code, or other data structure to store the information. In some implementations, the datastore 244 or a portion of the datastore 244 may be distributed across one or more other computing devices 102 or apparatus including support services 124, network attached storage apparatus, and so forth.

The datastore 244 may store one or more authorizations 246 corresponding to one or more different users 104. That is, the computing device 102 may be used or shared among two or more users 104, each having a respective security level or authority to view sensitive information, access particular services, and so on. Thus, respective security values or encoded serial numbers, digital certificates, or other information may be included within the authorizations 246 for use during requested access to respective services and so on. The datastore 244 may also store other data 248. For example, the other data 248 may include one or more data structures that may be queried, modified, amended, and so forth.

Figure 3:
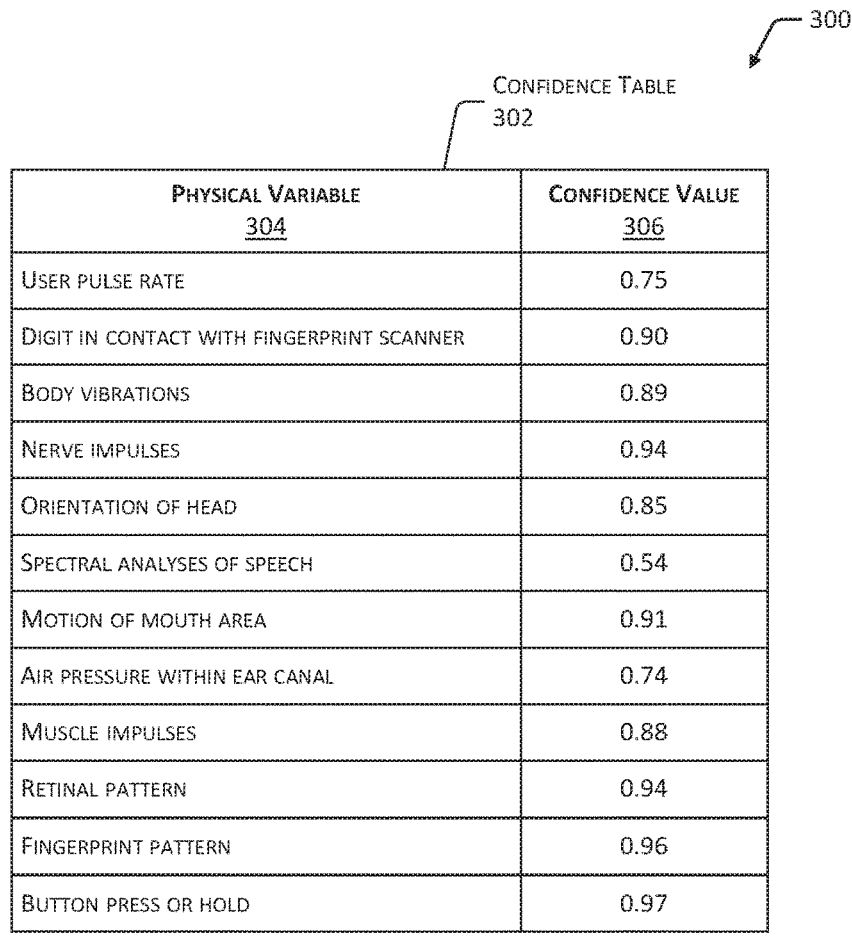
FIG. 3 depicts a machine learning module configured to generate confidence values based on one or more physical variables.
Figure 3:
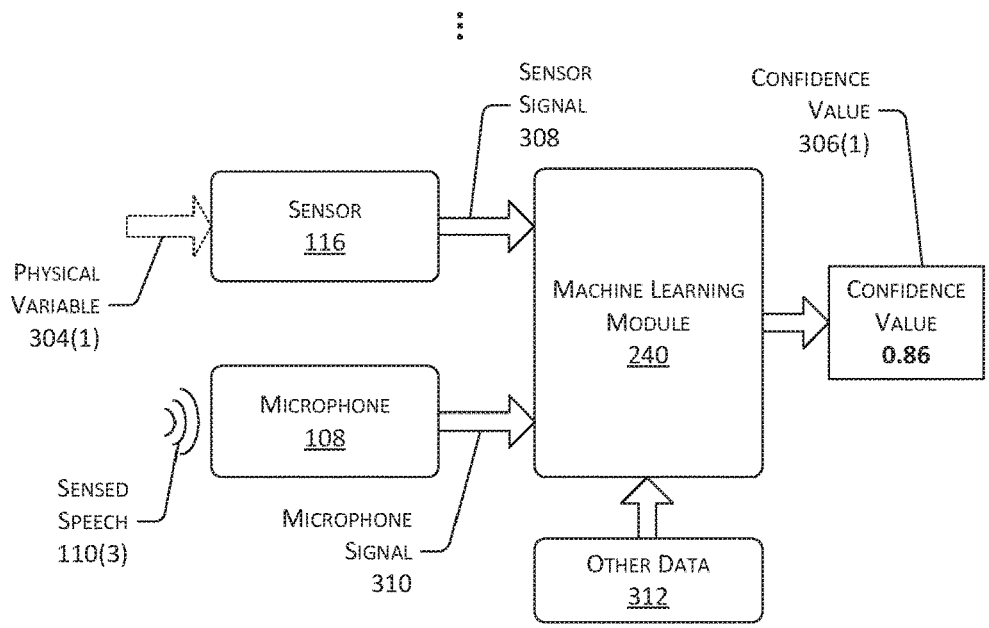

FIG. 3 depicts views 300 including a confidence table 302 and other respective elements. The respective elements and data depicted within the views 300 are illustrative and non-limiting, and other elements, examples, or respective operations may also be used.

The confidence table 302 includes respective physical variables 304. Each of the physical variables 304 corresponds to a user 104 related-phenomenon or characteristic that may exhibit factors comparable to another factor or factors exhibited by speech 110. For instance, a pulse rate of a user 104 may increase or exhibit slight arrhythmia during issuance of speech 110. Thus, such pulse rate changes or characteristics, as detected by an appropriate biomedical sensor 210, may be used to verify that presently detected speech 110 is that of an authorized user 104. Similar comparisons or correlations may also be derived for the other illustrative physical variables 304.

The confidence table 302 also includes respective confidence values 306. Each of the illustrative confidence values 306 is associated with one of the physical variables 304 and quantifies a likelihood that detection of that physical variable 304 correlates to speech 110 issued at or about that same time by a particular or authorized user 104. As indicated for illustration purposes, some physical variables 304 correspond to relatively greater confidence values 306 than others.

For instance, detecting motion of a mouth area of a user 104 may correspond to a confidence value 306 of 0.91 (i.e., 91%) that detected speech 110 is that of the same user 104. In contrast, detecting air pressure changes in an ear canal of a user 104 may correspond to a confidence value 306 of 0.74 (i.e., 74%) that the same user 104 is the source of detected speech 110. As depicted, some of the physical variables 304 are biomedical in nature, being involuntary responses or characteristics exhibited by the user 104 body. Other physical variables 304 correspond to deliberate acts on the part of a user 104, such as pressing or holding a button, or tilting their head to a predetermined orientation, while speaking. Still other physical variables 304, such as retinal patterns or fingerprints, are characteristics that are of a fixed nature unless injury, disease, or another factor causes them to change.

Also depicted is a sensor 116 configured to sense or detect a physical variable 304(1) and to provide a corresponding sensor signal 308. In turn, a microphone 108 is configured to detect speech 110(3) and to provide a corresponding microphone signal 310. The machine learning module 240, as introduced above, receives the sensor signal 308 and the microphone signal 310 and analyzes or compares these signals according to one or more analytical techniques, heuristics, or other processes. Such an analysis may result in machine learning data or information that is stored for later use during speech 110 or user 104 authentications.

In another implementation, the microphone 108 and microphone signal 310 are not used, and the machine learning module 240 receives user 104 command or data input by way of a keyboard, key pad, stylus and input tablet, or other input device or arrangement. Thus, the machine learning module 240 may be configured to operate based on input other than speech 110. The input device 114 may be configured to operate based on keyboarding, stylus writing, or other non-verbal inputs, as well.

The machine learning module 240 may also generate or provide a confidence value 306(1) in accordance with the analysis of the sensor signal 308 and the microphone signal 310. The machine learning module 240 may also use other data 312 provided by a sensor 116, a data structure stored on the support server 124, or another suitable source or apparatus. The other data 312 may include values, heuristics, mathematical functions, predefined operations or other information used during analysis or comparison of the sensor signal 308 and the microphone signal 310, calculation of the confidence value 306(1), and so on. The confidence value 306(1) is indicative of the probability, or likelihood, that the speech 110(3) originated from an authorized user 104—that is, a user 104 making authorized use of a computing device 102. The confidence value 306(1) may be provided to the input module 114 for use determining that speech 110 or another user input originated from an authorized user 104.

Figure 4:
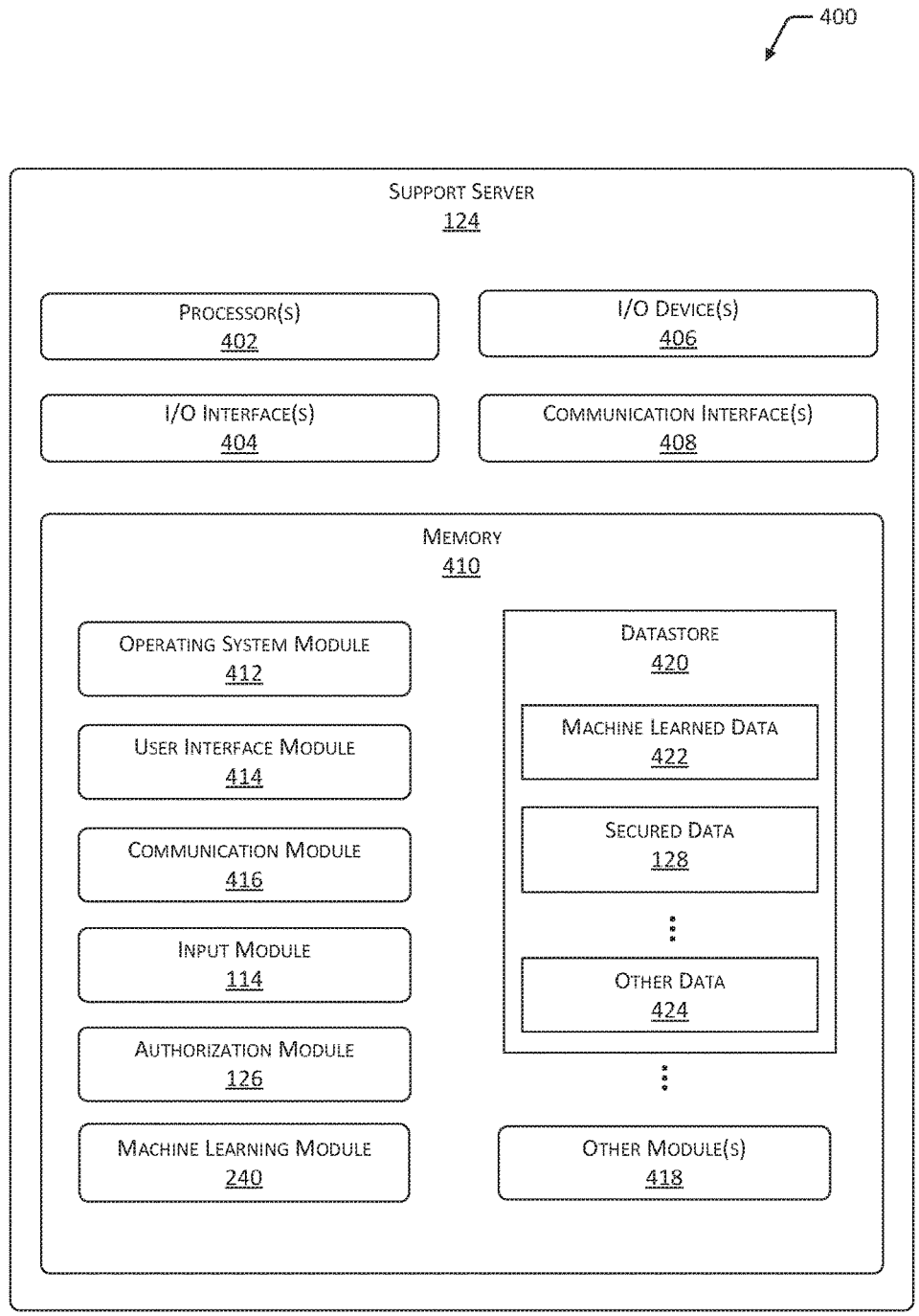
FIG. 4 is a block diagram depicting elements of a server configured to support input authentication.

FIG. 4 illustrates a block diagram 400 of the support server 124. The support server 124 is illustrative and non-limiting, and other services, servers, or devices of analogous or respectively varying configuration or constituency may also be used. The support server 124 may include one or more hardware processors 402 configured to execute one or more stored instructions. The processor(s) 402 may comprise one or more cores.

The support server 124 may include one or more I/O interface(s) 404 to allow the processor(s) 402 or other portions of the support server 124 to communicate with the computing devices 102, with other services, network-based devices, and so on. The I/O interfaces 404 may comprise I2C, SPI, USB, RS-232, and so forth.

The I/O interface(s) 404 may couple to one or more I/O devices 406. The I/O devices 406 may include one or more input devices such as a keyboard, mouse, and so forth. The I/O devices 406 may also include output devices such as one or more of a display, audio speakers, haptic output devices, and so forth. In some embodiments, the I/O devices 406 may be physically incorporated with the support server 124, or they may be externally placed.

The support server 124 may also include one or more communication interfaces 408. The communication interfaces 408 are configured to provide communications between the support server 124 and the computing devices 102, other services, servers, or network-based apparatus, routers, wireless access points 120, and so forth. The communication interfaces 408 may include wireless functions, devices configured to couple to one or more networks 122 including PANs, LANs, WLANs, WANs, and so forth. The support server 124 may also include one or more busses or other internal communications hardware or software that allow for the transfer of data between the various modules and components of the support server 124.

The support server 124 includes one or more memories 410. The memory 410 comprises one or more CRSM. The memory 410 provides storage of computer readable instructions, data structures, program modules and other data for the operation of the support server 124. The memory 410 may include at least one operating system module 412. Respective OS modules 412 are configured to manage hardware devices such as the I/O interfaces 404, the I/O devices 406, the communication interfaces 408, and provide various services to applications or modules executing on the processors 402.

Also stored in the memory 410 may be one or more of the following modules. These modules may be executed as foreground applications, background tasks, and so forth. A user interface module 414 may be configured to provide one or more application programming interfaces. The user interface module 414 may also generate or provide one or more user input devices or user selection devices to a computing device 102. Such user interfaces may be encoded as hypertext markup language ("HTML") files, extensible markup language ("XML") files, or in another suitable format or language. The user interface module 414 is configured to accept inputs and send outputs using the I/O interfaces 404, the communication interfaces 408, or both.

A communication module 416 is configured to support communication with various computing devices 102, one or more other support servers 124, apparatus, and so forth using the one or more networks 122. In some implementations, the communication module 416 may support encrypted communications. For example, hypertext transport protocol secured ("HTTPS") or transport layer security ("TLS") may be supported.

The memory 410 may also include an input module 114 as introduced above. The input module 114 may thus perform various operations in support of determining if detected speech 110 originates from an authorized user 104 of a computing device 102. The input module 114 may perform other actions or services, as well. The memory 410 may also include an authorization module 126 as introduced above. Thus, the authorization module 126 may be configured to authenticate a user 104 or a computing device 102 that is requesting a service or services.

The memory 410 may further include a machine learning module 240, as described above. The machine learning module 240 may be configured to identify patterns or other comparative characteristics by comparing detected speech 110 with one or more physical variables 304. The machine learning module 240 may also create or amend a data structure or other files including information, patterns, or "signatures", or other data as acquired or generated over time. The memory 410 may also include one or more other modules 418.

The memory 410 may also include a datastore 420 to store information. The datastore 420 may use a flat file, database, linked list, tree, executable code, or other data structure to store the information. In some implementations, the datastore 420 or a portion of the datastore 420 may be distributed across one or more other devices including servers, network attached storage devices, and so forth.

The datastore 420 may store machine learned data 422 as generated or amended by the machine learning module 240. The datastore 420 may also include secured data 128, such as information, values, data structures, listings, images, sound files, video matter, or other content that may be provided to a computing device 102 upon authorized request. The datastore 420 may further store other data 424. For instance, the other data 424 may include one or more scripts to automate respective functions, and so on. The other data 424 may also include one or more general, non-sensitive data structures that may be queried, modified, amended, and so forth.

Figure 5:
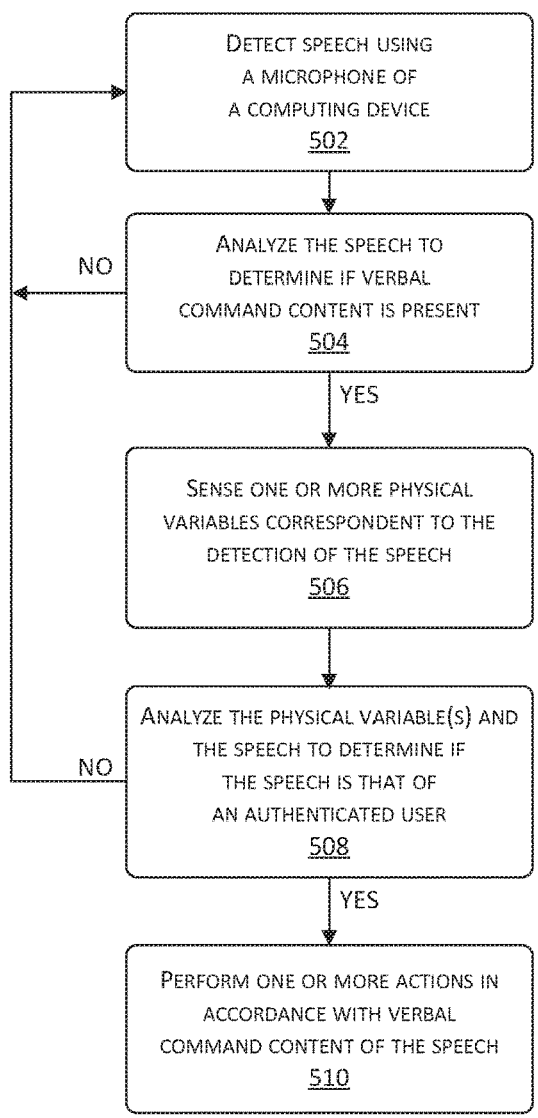
FIG. 5 is a flow diagram of an illustrative process of analyzing a physical variable and speech input to determine if the user is authorized to provide the input.

FIG. 5 depicts a flow diagram 500 that includes operations that may be performed toward the determination that speech 110 originates from an authorized user 104. The particular operations and elements of the flow diagram 500 are illustrative and non-limiting in nature. Other implementations and variations may also be used.

Block 502 detects speech 110 using a microphone 108 of a computing device 102. For purposes of a present example, the user 104(2) is authorized to use the computing device 102(2), a tablet computer, and to issue verbal commands or inputs thereto. Accordingly, the user 104(2) issues speech 110(2) including a verbal command for the computing device 102(2) to launch an application for displaying stored digital photographs.

Block 504 analyzes the speech 110 to determine if verbal command content is present. In the present example, the input module 114 of the computing device 102(2) analyzes the detected speech 110(2) to determine if any verbal commands or input are being issued. For purposes of illustration, it is assumed that the input module 114 correctly determines that a verbal command is communicated within the speech 110(2), calling for launch of a digital photo viewer. Thus, the process proceeds on to block 506. If no verbal command or input had been detected, the process would have ignored the speech 110(2) and returned to block 502, awaiting the next detected verbal issuance.

The determination of verbal command content at block 504 above may include determining what specific command or content is present in the detected speech 110(2). Speech recognition techniques, digital signal processing, signal sampling and comparison techniques, or other functions may be used to parse or identify specific words, commands, phrases, values, or other content with the detected speech 110(2).

Block 506 senses one or more physical variables 304 correspondent to the detection of the speech 110. In the present example, a sensor 116, in the form of a biomedical sensor 210, is disposed and configured to detect nerve impulses at a location on the user 104(2) near the jaw muscles. The sensing of nerve impulses occurs proximate in time, or contemporaneously, with the detection of the speech 110(2). The sensor signal 308 and the microphone signal 310 are provided simultaneously to the input module 114 of the computing device 102(2).

Block 508 analyzes the physical variable(s) 304 and the speech 110 to determine if the speech 110 is that of an authenticated user 104, an authorized user 104, or a user 104 which is authenticated and authorized. In the present example, the input module 114 analyzes the sensor signal 308 and the microphone signal 310 to determine if the speech 110(2) is that of the user 104(2). The input module 114 may apply heuristics, or compare the nerve impulses or the speech 110(2)—or both—to respective previously determined signatures or information, and so forth. In the present instance, the input module 114 determines that the presently detected speech 110(2) originated from the authorized user 104(2). Accordingly, the process proceeds on to block 510. Had the input module 114 determined that the speech 110(2) likely originated from someone other than the user 104(2), then the process would ignore the speech 110(2) and returned to block 502.

Block 510 performs one or more actions in accordance with verbal command content of the speech 110. In the present example, the input module 114 signals a processor 202 of the computing device 102(2) that the user 104(2) is authenticated and actions requested by the user 104(2) are authorized in view of the just-determined confidence value 306. In turn, the input module 114 provides digital information to the processor 202 detailing the specific command communicated within the speech 110(2). The processor 202 responds by launching a digital photo viewer application, wherein the user 104(2) may thereafter browse respective photo images, select those for viewing in detail, and so forth.

Figure 6:
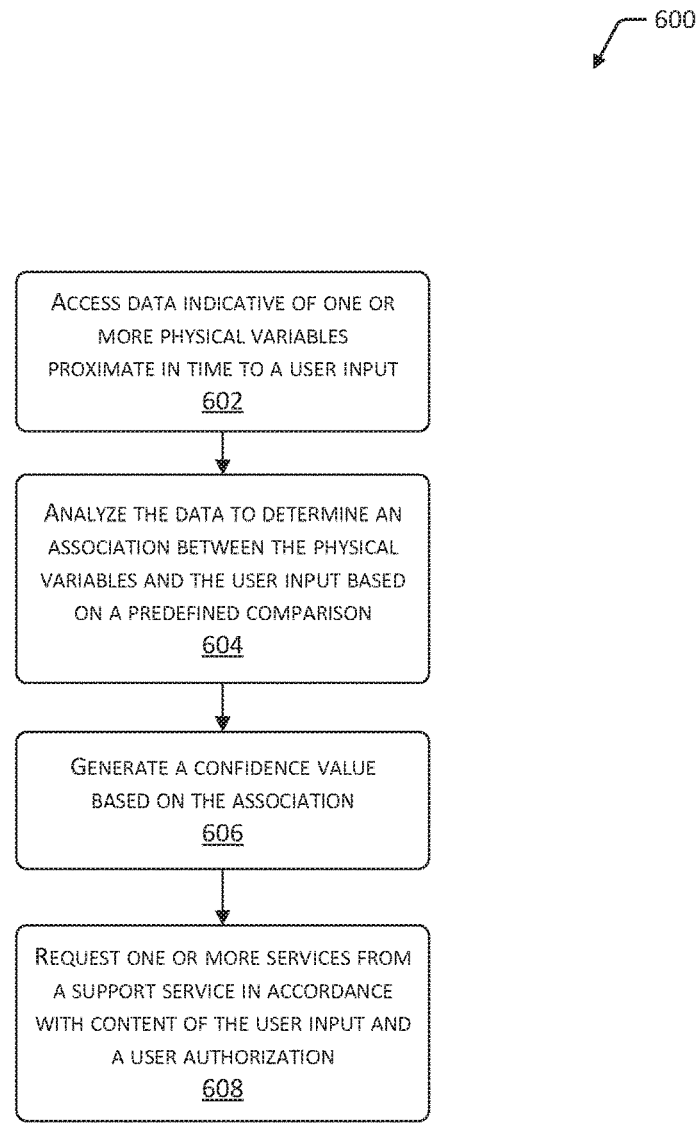
FIG. 6 is a flow diagram of an illustrative process of associating of a physical variable with a user input.

FIG. 6 depicts a flow diagram 600 that includes operations that may be performed toward the determination that a user input originates from an authorized user 104. The particular operations and elements of the flow diagram 600 are illustrative and non-limiting in nature. Other implementations and variations may also be used.

Block 602 accesses data indicative of one or more physical variables 304 proximate in time to a user 104 input. For purposes of a present example, the user 104(1) is making authorized use of the computing device 102(1), a wearable computer. An orientation sensor 212 provides a sensor signal 308 indicative of the tilt or orientation of the computing device 102(1) during operation. Contemporaneously, a microphone 108(1) provides data encoded within a microphone signal 310 indicative of detected speech 110(1) issued by the user 104(1). An input module 114 accesses data encoded within the sensor signal 308 such that real-time information regarding the orientation of the computing device 102(1) is acquired.

Block 604 analyzes the data to determine an association between the physical variable(s) 304 and the user 104 input based on a predefined comparison. In the present example, the input module 114 analyzes the data of the sensor signal 308 and that of the microphone signal 310 in accordance with a predefined comparison scheme. For instance, the input module 114 may be checking for tilt or angular orientation of the computing device 102(1) at 20 degrees or greater below horizontal as an indication that the speech 110(1) is intended as command input. Other physical variable 304 and speech 110 association schemes may also be used.

Block 606 generates a confidence value 306 based on the association. In the present example, the physical orientation of the computing device 102(1) is at 25 degrees below the horizontal, and thus at an angle of tilt greater than the illustrative threshold value of 20 degrees. The machine learning module 240 has previously determined the threshold value of 20 degrees, and based on the current set of motions and the physical orientation at 25 degrees, issues a confidence value 306 of 0.92 (i.e., 92%) likelihood that is an intentional input. This confidence value 306 may then be communicated to the input module 114.

Block 608 requests one or more services from a support server 124 in accordance with content of the user 104 input and a user authorization 246. In the present example, the input module 114 signals a processor 202 of the computing device 102(1) to proceed in accordance with command input within the speech 110(1). The input module 114 also provides data to the processor 202 indicating that a specific accounting file has been requested by way of speech 110(1).

In turn, the processor 202 issues a request for a specific accounting file to the support server 124, by way of the one or more network(s) 122. The request also includes an authorization 246 certificate for the user 104(1). The support server 124 responds by verifying the user's authorization 246 by operation of the authorization module 418. Thereafter, the support server 124 acquires the requested accounting file from secured data 128, and sends it to the computing device 102(1) way of the networks 122.

Figure 7:
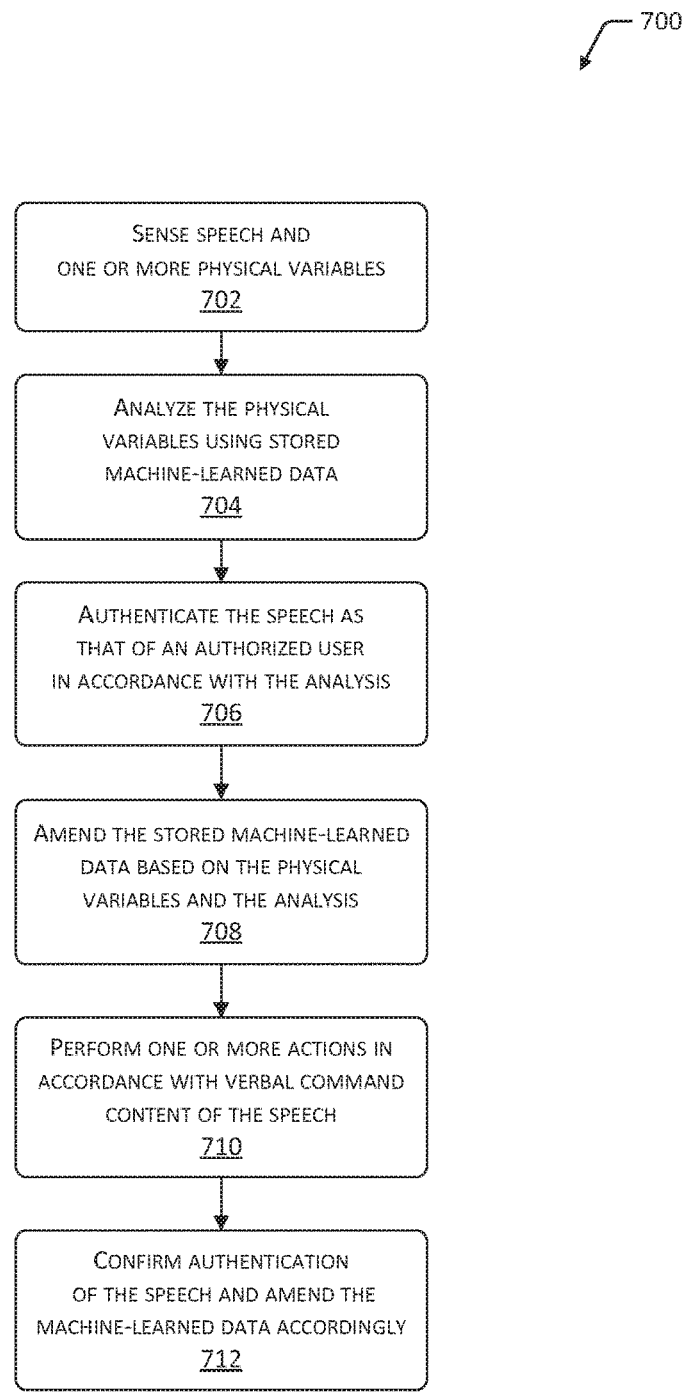
FIG. 7 is a flow diagram of an illustrative process of using machine learning to authenticate the user input.

FIG. 7 depicts a flow diagram 700 that includes operations that may be performed toward the determination that a user input originates from an authorized user 104. The particular operations and elements of the flow diagram 700 are illustrative and non-limiting in nature. Other implementations and variations may also be used.

Block 702 senses speech 110 and one or more physical variables 304. For purposes of a present example, the user 104(2) is authorized to use the computing device 102(2). The user 104(2) issues speech 110(2) including a verbal command to close a presently running e-book reader application. The speech 110(2) is sensed by a microphone 108(2) that provides a corresponding microphone signal 310. In turn, a sensor 116—specifically, a biomedical sensor 210 configured to sense body vibrations—provides a sensor signal 308. An input module 114 of the computing device 102(2) receives the microphone signal 310 and the sensor signal 308.

Block 704 analyzes the physical variables 304 using stored machine learned data 422. In the present example, the input module 114 accesses previously acquired machine learned data 422 and acquires a set of body vibration patterns corresponding to numerous authorized users 104. The input module 114 then uses these patterns to compare or analyze the present sensor signal 308 content. Specifically, the input module 114 operates to determine if the sensor signal 308 content is that of the known user 104(2). Heuristics, Fourier analysis, or other signal processing or comparison techniques may be used.

The machine learning module 240 is also operating contemporaneously with the input module 114. The machine learning module 240, in one embodiment, detects twelve characteristics of interest when comparing the sensor signal 308 with the body vibration patterns of the machine learned data 424. Such characteristics may include vibration frequencies, peak levels, patterns defined by peaks and lulls in body vibrations, or other factors. Of these illustrative characteristics, two represent a continuation of a pattern previously detected with respect to the user 104(2). Thus, these two new body vibration characteristics constitute new machine learned information.

Block 706 authenticates the speech 110 as that of an authorized user 104 in accordance with the analysis. In the present example, the input module 114 determines that the speech 110(2) is very likely that of the authorized user 104(2). Additionally, the machine learning module 240 assigns a confidence value 306 of 0.91 (i.e., 91%) to the just-determined authentication, and communicates this information to the input module 114. The input module 114 then provides a positive signal to a processor 202 of the computing device 102(2). The signal may be indicative of one or more of authentication, authorization, or the confidence value 306.

Block 708 amends the stored machine learned data 422 based on the physical variables 304 and the analysis. In the present example, the machine learning module 240 amends the existing machine learned data 422, adding the two newly identified characteristics from block 704 above. Thus, the machine learned data 422 includes additional information that may be used by the input module 114 when performing future authentications of detected speech 110.

Block 710 performs one or more actions in accordance with verbal command content of the speech 110. In the present example, an input module 114 of the computing device 102(2) indicates to the processor 202 to close the e-book reader application. The processor 202 responds by performing one or more operations such that the e-book reader application is discontinued and shut down. Particular commands or operations may or may not be available to the user 104(2) based on confidence values 306 assigned to particular speech 110 events, and so forth, in the interest of additional security. For example, a command which has low confidence value 306 may perform a low security operation such as taking a picture, while a high confidence value 306 may be used to perform a high security operation such as sending encrypted data.

Block 712 confirms the authentication of the speech 110 and amends the stored machine learned data 422 accordingly. In the present example, the machine learning module 240 verifies that the user 104(2) does not retract or "undo" the action or actions just performed at block 710. Such a retraction may indicate that the authentication made at block 706 was in error, resulting in the performance of unauthorized actions at block 710. If such a retraction is detected, then the machine learning module 240 may change the machine learned data 422 to reflect the negative user 104(2) feedback just received. In the present example, it is assumed that no user 104(2) retraction is made and that the authentication at block 706 was correct.

Thus, the machine learned data 422 may evolve in accordance with both correct and incorrect analysis and determinations made by the machine learning module 240. The machine learned data 422 may thus improve in detail and accuracy over the course of time and operational experience, giving rise to greater security and user confidence when operating the computing device 102(2) in public venues.

Those having ordinary skill in the art will readily recognize that certain steps or operations illustrated in the figures above can be eliminated or taken in an alternate order.

Moreover, the methods described above may be implemented as one or more software programs for a computer system and are encoded in a computer readable storage medium as instructions executable on one or more processors.

Embodiments may be provided as a computer program product including a nontransitory computer readable storage medium having stored thereon instructions (in compressed or uncompressed form) that may be used to program a computer (or other electronic device) to perform processes or methods described herein. The computer readable storage medium can be any one of an electronic storage medium, a magnetic storage medium, an optical storage medium, a quantum storage medium and so forth. For example, the computer readable storage media may include, but is not limited to, hard drives, floppy diskettes, optical disks, read-only memories (ROMs), random access memories (RAMs), EPROMs, EEPROMs, flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A computing device configured to:
    detect audio input to a computing device;
    analyze the audio input to identify command content present in the detected audio input;
    sense, using a biomedical sensor, one or more physical variables of a body of a user of the computing device correspondent to the detection of the audio input;
    compare the one or more physical variables of the user sensed with the biomedical sensor with previously acquired data known to be associated with a given authorized user;
    identify, from the comparison, an impulse pattern signature for the given authorized user to determine the impulse pattern signature is associated with the user of the computing device;
    analyze the impulse pattern signature and the audio input to determine a correlation between patterns in the impulse pattern signature and the audio input;
    based on the correlation between patterns in the impulse pattern signature and the audio input, generate a confidence value indicative of a likelihood that the detected audio input is associated with speech of the user of the computing device;
    based on the generated confidence value, determine when the audio input is associated with an authenticated and authorized user;
    determine one or more actions associated with the command content that are authorized by the generated confidence value; and
    perform one or more actions associated with the command content that are authorized by the generated confidence value based at least in part on the command content present in the detected audio input.

2. The computing device of claim 1, wherein the biomedical sensor is configured to sense muscle impulses related to jaw motion.

3. The computing device of claim 1, wherein the biomedical sensor is further configured to sense at least one or more of a respiration rate of the user, a pulse rate of the user, muscle activity of the user, nerve impulses of the user, or orientation of at least one eye of the user.

4. The computing device of claim 1, further configured to:
    access machine-learning information associated with the one or more physical variables of the body of the user of the computing device; and
    update the machine-learning information over time in accordance with changes in the one or more physical variables of the body of the user.

5. A method performed at least in part by a computing device, the method comprising:
    identifying a user of a computing device based on sensing directly, using a biometric sensor, an invariant characteristic of a body of a user;
    sensing speech at a time proximate to the sensing of the invariant characteristic of the body of the user;
    sensing, contemporaneously to the sensing of the speech, a physical variable of the body of the user of the computing device using a biomedical sensor;
    comparing the physical variable of the body of the user sensed with the biomedical sensor with previously acquired data known to be associated with a given authorized user;
    identifying, from the comparison, an impulse pattern signature for the given authorized user;
    determining the impulse pattern signature is associated with the user of the computing device;
    analyzing the impulse pattern signature and the audio input to determine a correlation between patterns in the impulse pattern signature, the invariant characteristic of the body of the user, and the speech;
    based on the analyzing, determining a correlation between the impulse pattern signature and the audio input to determine a correlation between patterns in the impulse pattern signature, the invariant characteristic of the body of the user, and the speech;
    based on the correlation between patterns in the impulse pattern signature and the audio input to determine a correlation between patterns in the impulse pattern signature, the invariant characteristic of the body of the user, and the speech, generating a confidence value indicative of a likelihood that the speech is associated with the user of the computing device;
    based on the generated confidence value, determining the audio input is associated with an authenticated and authorized user;
    determining one or more actions that are associated with the generated confidence value; and authorizing access to at least one resource of the computing device associated with the generated confidence value.

6. The method of claim 5, further comprising performing one or more actions using the computing device in response to the confidence value exceeding a predetermined threshold.

7. The method of claim 5, further comprising:
identifying one or more verbal commands within the speech, the verbal commands corresponding to actions performable at least in part by the computing device; and
performing, in accordance with the verbal commands, one or more actions using the computing device.

8. The method of claim 5, further comprising:
determining that the user is an authorized user of the computing device based on the sensing of the invariant characteristic of the body of the user using the biometric sensor and the at least one of an involuntary physical variable of the body of the user using the biomedical sensor; and
performing one or more actions using the computing device in accordance with the determination.

9. The method of claim 5, further comprising:
accessing machine-learning information associated with the one or more physical variables of the body of the user of the computing device; and
updating the machine-learning information over time in accordance with changes in the one or more physical variables of the body of the user.

10. The method of claim 5, wherein the biomedical sensor is configured to sense at least one or more of a respiration rate of the user, a pulse rate of the user, muscle activity of the user, nerve impulses of the user, or orientation of at least one eye of the user.

11. The method of claim 5, further comprising sensing a user force input to a button, wherein the button is configured to provide signals to the computing device.

12. The method of claim 5, further comprising sensing movement of a mouth of the user, the movement sensed using a camera configured to provide image signals to the computing device.

13. The method of claim 5, wherein the computing device is a wearable computer, the wearable computer sensing an orientation of a head of the user using a sensor of the wearable computer.

14. The method of claim 5, further comprising:
determining that the user is authorized to perform one or more operations using the computing device based at least in part on the invariant characteristic sensed by the biometric sensor and the at least one of the involuntary physical variable of the body of the user of the computing device using the biomedical sensor; and
performing one or more actions using the computing device in accordance with the determination;
wherein the biometric characteristic includes at least one or more of a fingerprint, a retinal pattern, or a facial pattern.

15. A system comprising one or more computing devices collectively configured to:
sense directly an involuntary physical variable associated with a user's body using a non-acoustic biomedical sensor;
receive a user input including command content;
compare the involuntary physical variable sensed using the non-acoustic biomedical sensor with previously acquired information known to be associated with a given authorized user;
identify, from the comparison, an impulse pattern signature for the given authorized user;
analyze the impulse pattern signature and the user input to determine a correlation between patterns in the impulse pattern signature and the user input;
based on the correlation between patterns in the impulse pattern signature and the user input, generate a confidence value indicative of a likelihood that the command content is associated with the given authorized user;
determine, based at least in part on the analysis, that the given authorized user is authorized to use one or more resources of the system that are associated with the generated confidence value; and
perform, based on the one or more resources of the system being associated with the generated confidence value, one or more actions corresponding to the command content of the user input.

16. The system of claim 15, wherein the user input includes at least one or more of human speech received by way of a microphone, a physical gesture received by way of a range camera, or textual input received by way of one or more buttons.

17. The system of claim 15, wherein the involuntary physical variable includes at least one time-varying characteristic correspondent to a time-varying characteristic of the user input.

18. The system of claim 15, wherein the user input is speech input received by way of a microphone, the one or more computing devices further collectively configured to:
identify one or more verbal commands communicated by way of the speech; and
perform the one or more actions in accordance with the verbal commands.

19. The system of claim 15, the one or more computing devices further collectively configured to:
send a request for one or more services in accordance with the command content of the user input; and
receive at least one or more of information or a service result in accordance with the request.

20. The system of claim 15, the one or more computing devices further collectively configured to:
access machine-learning information associated with the involuntary physical variable associated with a user's body; and
update the machine-learning information over time in accordance with changes in the involuntary physical variable associated with a user's body.

* * * * *